(12) United States Patent
Kratschmar et al.

(10) Patent No.: US 11,149,703 B2
(45) Date of Patent: Oct. 19, 2021

(54) ISOLATION VALVE FOR PRESSURIZED TANK

(71) Applicants: CHINA ENERGY INVESTMENT CORPORATION LIMITED, Beijing (CN); NATIONAL INSTITUTE OF CLEAN-AND-LOW-CARBON ENERGY, Beijing (CN)

(72) Inventors: Kenneth William Kratschmar, Mountain View, CA (US); Xianming Jimmy Li, Mountain View, CA (US); Cullen Hall, Mountain View, CA (US); Edward Youn, Mountain View, CA (US); Jeff Allen, Mountain View, CA (US)

(73) Assignees: China Energy Investment Corporation Limited, Beijing (CN); National Institute of Clean-and-Low-Carbon Energy, Beijing (CN)

( * ) Notice: Subject to any disclaimer, the term of this patent is extended or adjusted under 35 U.S.C. 154(b) by 205 days.

(21) Appl. No.: 16/564,241

(22) Filed: Sep. 9, 2019

(65) Prior Publication Data

US 2020/0240379 A1 Jul. 30, 2020

Related U.S. Application Data

(60) Provisional application No. 62/796,637, filed on Jan. 25, 2019.

(51) Int. Cl.
*F02M 59/46* (2006.01)
*F02M 63/00* (2006.01)
*F02M 21/02* (2006.01)
*F02M 59/48* (2006.01)
(Continued)

(52) U.S. Cl.
CPC ...... *F02M 59/462* (2013.01); *F02M 21/0218* (2013.01); *F02M 21/0221* (2013.01); *F02M 63/005* (2013.01); *F02M 59/466* (2013.01); *F02M 59/48* (2013.01); *F02M 63/0225* (2013.01); *F04B 53/10* (2013.01)

(58) Field of Classification Search
CPC .... F02M 59/462; F02M 59/466; F02M 59/48; F02M 63/005; F02M 63/0225; F02M 21/0221; F02M 21/0218; F04B 53/10
USPC ...................................... 137/493.3
See application file for complete search history.

(56) References Cited

U.S. PATENT DOCUMENTS 3,963,381 A 6/1976 Kohnen
4,080,106 A * 3/1978 Haesloop .............. F04D 29/086
222/333

(Continued)

FOREIGN PATENT DOCUMENTS

WO 2015184537 A1 12/2015

*Primary Examiner* — Mahmoud Gimie

(57) ABSTRACT

An isolation mechanism for isolating a submerged pump in a storage vessel, where the isolation mechanism comprises a primary valve member and a secondary valve member, which are both biased in a fail-closed position. The isolation mechanism allows for redundancy for safety and reliability, and can be operated externally of the storage vessel. Furthermore, the isolation mechanism comprises venting and purging devices for safe operation of removal and installation of the pump in the storage vessel.

19 Claims, 15 Drawing Sheets

(51) Int. Cl.
*F04B 53/10* (2006.01)
*F02M 63/02* (2006.01)

(56) References Cited

U.S. PATENT DOCUMENTS

| | | | | |
|---|---|---|---|---|
| 5,363,827 | A * | 11/1994 | Siekmann | F02M 37/106 |
| | | | | 123/509 |
| 5,659,214 | A * | 8/1997 | Guardiani | F04D 7/045 |
| | | | | 310/87 |
| 7,032,575 | B2 * | 4/2006 | Sims, Jr. | F02M 37/106 |
| | | | | 123/509 |
| 8,439,654 | B2 * | 5/2013 | Cho | F04B 15/08 |
| | | | | 417/360 |
| 2015/0217987 | A1 | 8/2015 | Emmer et al. | |

* cited by examiner

ISOLATION VALVE FOR PRESSURIZED TANK

CROSS REFERENCE TO RELATED APPLICATIONS

This application claims the benefit of U.S. provisional application No. 62/796,637, filed Jan. 25, 2019, titled "ISOLATION VALVE FOR PRESSURIZED TANK," which is incorporated herein by reference.

TECHNICAL FIELD

The present disclosure relates to a valve for fluid isolation applications, and more particularly, to an isolation valve for pressurized tanks or storage vessels.

BACKGROUND

A submerged pump in a cryogenic storage tank maintains a constant temperature at about the working fluid temperature even during intermittent operation. Not only does the constant temperature of the pump reduce thermal cycling and extend lifetime of the pump, but also allows fast restart and minimizes vaporization loss during the startup phase. But placement of the pump inside the storage tank and removal of the pump from the storage tank for maintenance poses challenges in minimizing heat leakage and isolation of the fluid. In particular, without a proper isolation mechanism, the storage tank must be drained before pump removal, causing potentially the loss of the full content of the storage tank and a financial, safety and environmental concern.

For example, WO 2015/184537 A1 discloses a receptacle that houses a submerged pump in a cryogenic storage tank. The receptacle has a double-wall vacuum insulated housing to securely fix the pump inside the storage tank. At the bottom of the housing and through the double-wall, the housing is connected to the cryogenic storage tank by a thermally compensated tube segment (a bellows section), allowing fluid communication between the storage tank and the housing and subsequently the pump inlet. An isolation valve, biased to stop fluid from flowing out of the cryogenic space unless it is actuated into an open position, is installed at the end of the bellows section. The bias is provided by a spring, gravity of a disc, or the hydrostatic head of the cryogenic liquid. A hand-crank actuator operates the valve from outside the cryogenic storage tank through a rod and a cable. Additionally, the pump receptacle housing is in fluid communication with the cryogenic vapor space for pressure equalization so that a build-up of differential pressure is not allowed to force the isolation valve to open. A separate purging arrangement is also disclosed to allow any remaining cryogen inside the pump housing to clear before the pump is safely removed for service. Not only does the isolation valve not automatically engage with the presence of the pump, the rod-and-cable arrangement is an unreliable actuation mechanism, and the isolation provided by a single disc is precarious at best and does not provide redundancy in case of leakage of the primary isolation valve.

U.S. Pat. No. 3,963,381 discloses a cryogen tank isolation valve that is spring-loaded in the closed position until a pump is lowered by a hand-crank actuator rod to force the valve open. This valve, called a foot valve because it is located at the bottom of the pump housing, is forced open by the weight of the pump/motor assembly and the additional pressure applied by the actuator rod. This isolation valve can also be forced open by differential pressure supplied through a purging port. In a normal operation mode, the cryogenic fluid can enter the pump housing from all positions along the circumference of the pump housing or multiple fluid ducts to allow even flow distribution. When the pump is to be removed for service, it is raised by the actuator rod, while a purge gas is supplied that continues to force the foot valve open, thus blowing the cryogen liquid and gas back into the cryogenic storage tank. Separately, a line connects the pump discharge space with the storage tank vapor space with a shutoff valve and check valve. If desired, the shutoff valve can be opened and fluid in the pump discharge space can flow through the check valve into the vapor space of the storage tank. The purging fluid, however, can introduce impurities into the cryogenic storage tank and can also increase the tank pressure and necessitates venting of the tank for safety.

US 2015/0217987A1 recognizes that most foot valves are operated by the weight of the submerged pump and are biased in a closed position against the open end of the submerged pump housing. Such valves are held in place by a series of springs. When the pump is lowered into a normal working position, the pump contacts the foot valve. The weight of the pump overcomes the force of the springs to open the valve, thus creating a fluid communication channel between the cryogenic storage tank and the pump. However, US 2015/0217987A1 discloses a method using multiple actuator rods to provide even loading on the foot valve sealing disc, where the actuator rods are pneumatically operated to allow remote operation. The valve has a fail-close position where, if pneumatic pressure is absent, the valve is closed by the springs. US 2015/0217987A1, however, does not teach a proper venting and purging mechanism to allow safe removal of the pump which renders this method impractical.

In view of such prior art teachings, it is understood that redundancy in the sealing mechanism to safely isolate the cryogenic tank from the pump housing is needed. There is also a need of an arrangement that allows the safe depressurization and purging of the pump housing of any residual cryogenic fluid before pump removal, without introducing impurities into the storage tank or raising its pressure. An external actuating means that can be either manually and/or pneumatically operated for safe operation even in an emergency situation is also needed. Furthermore, there is a need to provide an isolation mechanism that is easy to fabricate, removable if required, and easy to repair and maintain.

SUMMARY

The embodiments of the present disclosure provide an isolation mechanism for pressurized tanks or storage vessels, including actuator assemblies and foot valve assemblies, wherein, the isolation mechanism comprises a primary valve member that is configured to be biased in a fail-closed position that provides a first means for isolation of a pump, e.g., a submergible pump; a secondary valve member that is configured to be biased in fail-closed position that provides a second and redundant means for isolation of the pump; and actuator assemblies that comprise actuator tubes which are hollow tubes, where the actuator tubes are configured to actuate the primary valve member, and to provide venting and purging for safe depressurization and clearing of any residual liquid or vapor.

In another embodiment, a fluid delivery system is provided that comprises a storage vessel for storing a fluid, e.g., a cryogen; a pump housing or socket provided in the storage vessel; a pump insertable into the pump housing; and an isolation mechanism comprising a primary valve member provided at one end of the pump housing near a bottom of the storage vessel in the fluid, said primary valve member configured to be biased in a fail-closed position and configured to isolate the pump in the pump housing from the storage vessel, a secondary valve member provided at the one end of the pump housing, said secondary valve member configured to be biased in a fail-closed position and configured to provide a second and redundant isolation of the pump in the pump housing from the storage vessel; wherein the primary member is configured to be actuatable externally of the storage vessel, wherein the secondary member is actuated automatically when the pump is positioned on the isolation mechanism, and wherein the primary valve member comprises actuators that are hollow tubes configured to provide venting and purging for depressurization and clearing of any residual liquid or vapor in the pump housing.

In yet another embodiment, a method is provided for removing and/or installing a pump in a storage vessel comprising the steps of closing a primary valve member provided at one end of a pump housing in the storage vessel by actuating an actuator, wherein the primary valve member is configured to be biased in a fail-closed position, wherein the closing of the primary valve member isolates the pump in the pump housing from the storage vessel, and removing the pump, wherein the removal of the pump automatically closes a secondary valve member provided at the one end of the pump housing, wherein said secondary valve member is configured to be biased in a fail-closed position and configured to provide a second and redundant isolation of the pump housing.

In other embodiments, the method further comprises installing the pump on the secondary valve member which causes the secondary valve member to open, and opening the primary valve member by actuating the actuator so that fluid in the storage vessel is introduced into the pump housing.

BRIEF DESCRIPTION OF THE DRAWINGS

In order to illustrate technical solutions in embodiments of the present disclosure, the accompanying drawings to be used in the description of embodiments will be introduced briefly. Obviously, the accompanying drawings to be described below are merely some embodiments of the present disclosure, and a person of ordinary skill in the art can obtain other embodiments according to these drawings.

Figure 1:
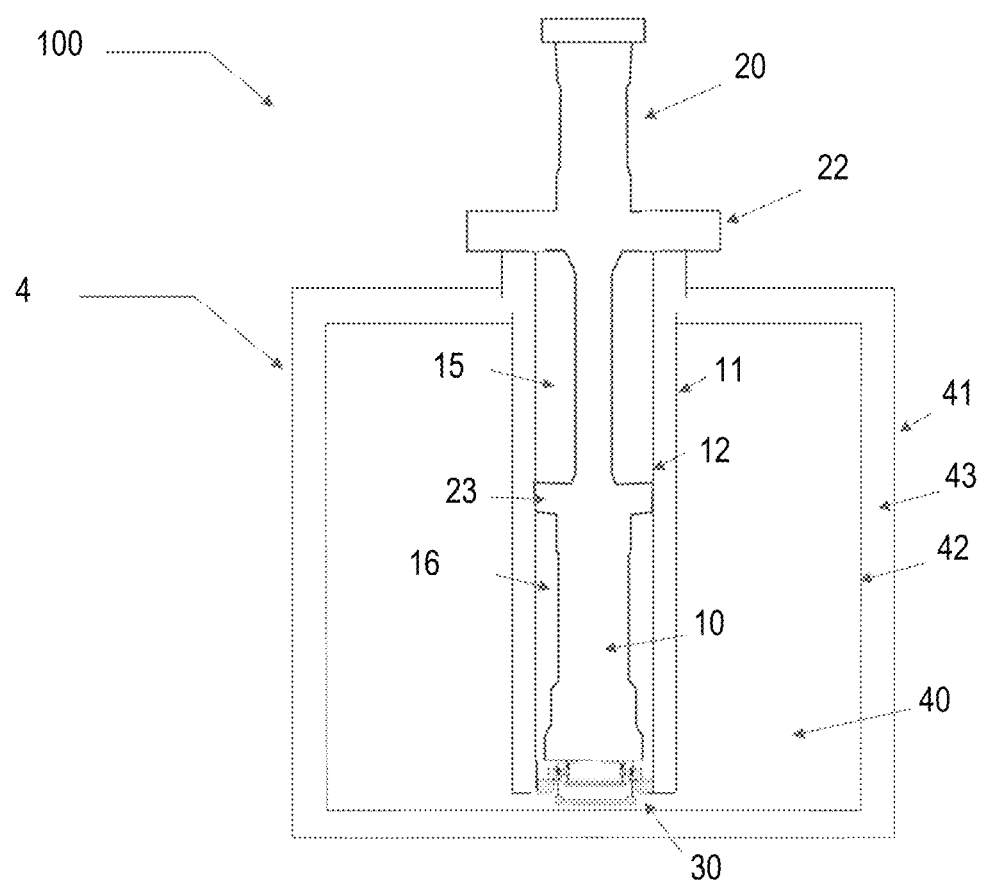
FIG. 1 is a schematic diagram of a fluid delivery system according to some embodiments of the present disclosure.

In the various figures, similar elements are provided with similar reference numbers. It should be noted that the drawing figures are not necessarily drawn to scale, or proportion, but instead are drawn to provide a better understanding of the components thereof, and are not intended to be limiting in scope, but rather provide exemplary illustrations.

DETAILED DESCRIPTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims. The subject matter described herein is capable of other embodiments and of being practiced or of being carried out in various ways.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two."

As used herein, "first," "second," "third," etc. are used to distinguish from among a plurality of steps and/or features, and is not indicative of the total number, or relative position in time and/or space unless expressly stated as such.

The technical solutions in the embodiments of the present disclosure will be described clearly and completely with reference to the accompanying drawings in the embodiments of the present disclosure. The described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Some embodiments of the present disclosure provide at least one redundant isolation mechanism for the safe isolation of a pump housing from a storage vessel having at least one of the following features: at least one external actuating means of the isolation mechanism that can be either manually and/or pneumatically operated for safe operation even in an emergency situation, at least one venting and purging mechanism to clear the pump housing of any residual fluid before pump removal without introducing impurities into the storage vessel or raising its pressure, and the isolation mechanism that is serviceable without cutting open the storage vessel.

In some embodiments of the present disclosure, the isolation mechanism can be at least one foot valve comprising a primary and a secondary isolation valve member. The isolation mechanism is disposed toward the bottom of the storage vessel to minimize dead volume and can be an integral part of the pump housing. The secondary isolation valve member is biased in the closed position and is actuatable in the open position by the weight of the pump. The primary isolation valve member is also biased in the closed position and is actuatable by actuators, which can comprise a set of connectors that can be manipulated either manually or pneumatically from outside the pump housing. The actuators are hollow tubes that have openings in fluid communication in different (or the same) areas of the pump housing. The hollow tubes also allow venting of residual fluid in the pump housing and purging with a purge gas to allow safe handling of the pump for removal.

During normal operations, the primary isolation valve member is opened using the actuators and the secondary isolation valve member of the isolation mechanism is also opened because the pump is in a working position where the weight of the pump forces the secondary valve member to the open position. Since both the primary and secondary isolation valve members are in the open position, fluid from the storage vessel can flow freely from the storage vessel through a passage created by the open position of the primary isolation valve member and a passage created by the open position of the secondary isolation valve member into a pump suction of the pump to complete the fluid supply path.

When the pump is to be removed, the primary isolation valve member of the isolation valve is actuated to the closed position, either manually or pneumatically, which cuts off the supply of fluid to the pump. Since the space in the pump housing is still filled with liquid, the pump can be operated to pump out the remaining fluid which will also vaporize due to the reduced pressure. The pumping can then be followed by venting and purging with an inert gas, if necessary. The pressure of the pump housing is continuously monitored to ensure all remaining fluid is removed and to ensure an over-pressurization is not present which can force the primary valve member to the open position. The pump can then be lifted out of the pump housing, where the lifting of the pump closes the secondary isolation valve member, creating a redundant sealing mechanism of the pump housing from the storage vessel. Once the pump is out of the pump housing, a sealing flange can be used to seal the housing to minimize heat leak and impurity ingress, or a replacement pump can be placed immediately.

FIG. 1 is a schematic diagram of a fluid delivery system according to one embodiment of the present disclosure.

Referring to FIG. 1, a fluid delivery system 100 comprises a submergible pump 10, which can be inserted into a storage vessel 4, and a power drive 20, which can be an electric, hydraulic, or pneumatically driven motor to drive the pump 10. The storage vessel 4 comprises an external wall 41, inner wall 42 and a vacuum space 43 therebetween, and a pump housing for receiving the submergible pump 10, where the pump housing can be inserted through an opening in the storage vessel 4 (and attached via welding and/or bolted and/or other attaching means to the storage vessel) or constructed as an integral part of the storage vessel 4. The submergible pump 10 is housed in the pump housing, which comprises a double-wall vacuum structure having a socket inner wall 12 and a socket outer wall 11, and is placed substantially at the bottom of the storage vessel 4 within a fluid 40, e.g., cryogen fluid, to minimize any dead volume for the pump suction. An isolation mechanism 30 is disposed toward the bottom of the submergible pump, where together with the socket walls of the pump housing, the isolation mechanism 30 provides controlled fluid isolation that can separate the fluid 40 in the storage vessel 4 from the pump suction of the submergible pump 10. An extension flange 23 can be provided that divides an interior space of the pump housing into a cold end space 16 and a warm end space 15. The high-pressure discharge line (not shown) of the submergible pump 10 is routed out to an end user through a pump-socket flange 22, which seals the submergible pump 10 in the pump housing and the storage vessel 4. The pump-socket flange 22 can include an O-ring, rubber and/or metal and/or carbide and/or composite seal or gasket to ensure sealing of the pump 10 in the pump housing.

Figure 2:
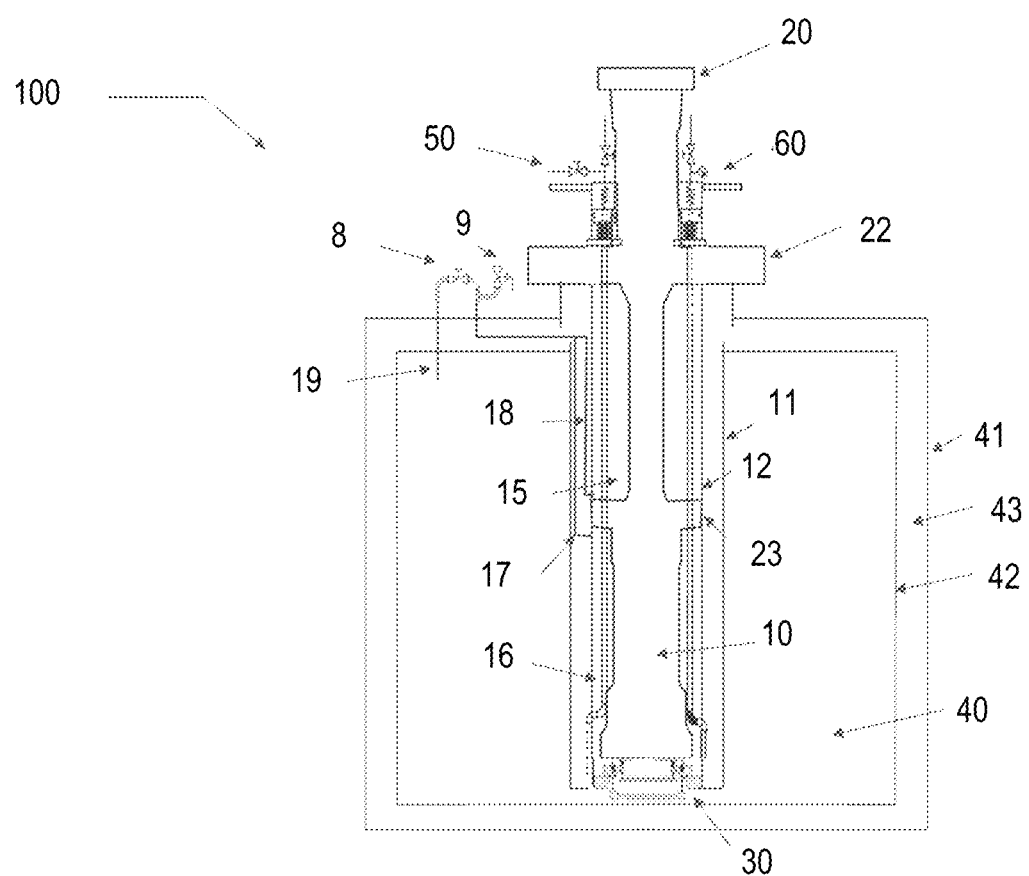
FIG. 2 is a schematic diagram of the fluid delivery system with subsystems according to some embodiments of the present disclosure.

FIG. 2 is a schematic diagram of a subsystem for the fluid delivery system according to some embodiments of the present disclosure.

Referring to FIG. 2, the fluid delivery system 100 comprises first and second actuator assemblies 50, 60, which are shown as pneumatically operated actuators that manipulate the isolation mechanism 30, which can be operated by air and/or hydraulics and/or springs. A cold space vent line 17 connected to the cold end space 16 and a warm space vent line 18 connected to the warm end space 15 are connected together above a liquid level in the storage vessel, which is connected to a pressure relief device 9, a manually or automatically operated valve 8, and a pressure equalization line 19, which vents back into the vapor space, e.g., above the liquid level, of the storage vessel 4, during normal operation, e.g., pump operation. The cold space and warm space vent lines 17, 18 are provided, in part, to be able to equalize the pressures in the cold end space 16, the warm end space 15, and the storage vessel 4. The cold space and warm space vent lines 17, 18 are also provided to prevent vapor from collecting at the top of the cold end space 16, where if the vapor is collected at the top of the cold end space 16, due to frictional heating between of the moving piston against the cylinder of the pump or due to seal leakage during pump operation, the operation of the submergible pump 10 may be inhibited, e.g., cavitation of the pump.

Figure 3:
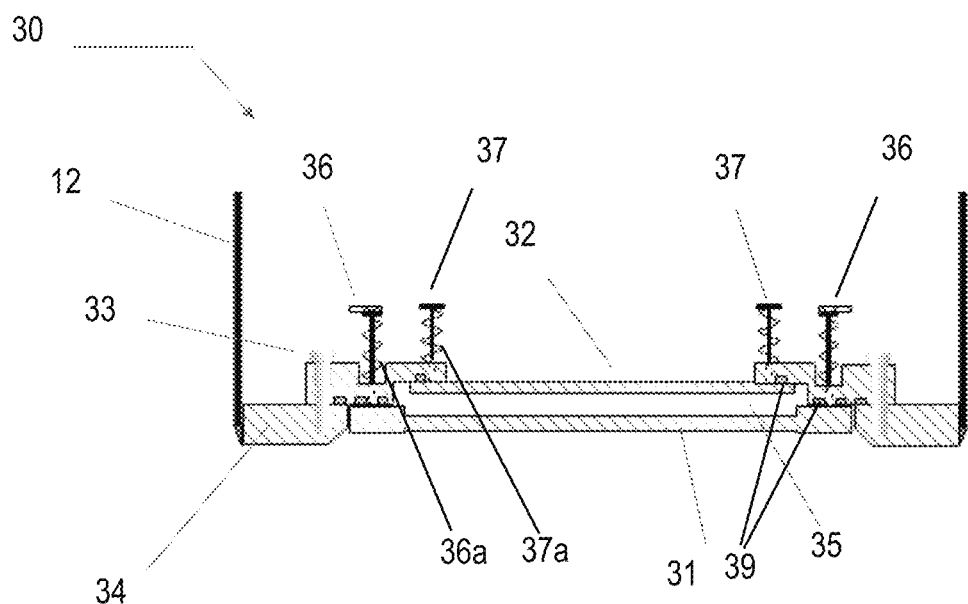
FIG. 3 is a schematic diagram of an isolation mechanism according to some embodiments of the present disclosure.

FIG. 3 is a schematic diagram of an isolation mechanism that can be used according to some embodiments of the present disclosure Referring to FIG. 3, the isolation mechanism 30 comprises at least one primary valve member 31, at least one secondary valve member 32, a retainer 34, and mounting means 33, which can be bolts, screws, welding, and/or other mounting means for securing the isolation mechanism to the retainer 34. The retainer 34 is attached to the socket inner wall 12 via welding, molding, or bolting, or can be provided as a lip or ledge along the open end of the pump housing. The primary valve member 31 comprises primary contacts 36 connected to the primary valve member by a connecting rod, support, pin, tube, etc., where the primary contacts 36 are configured to actuate the primary valve member 31, and the secondary valve member 32 comprises secondary contacts 37 connected to the secondary valve member by a connecting rod, support, pin, tube, etc., where the secondary contacts 37 are configured to actuate the secondary valve member 32. The primary contacts 36 and the secondary contacts 37 are both configured to be biased toward a closed position, where springs 36a, 37a are provided to press the contacts 36, 37 upward in a relaxation state of the spring to bring the respective valve member in a seal-closed position against abutting surfaces of the isolation mechanism 30. Seals 39 can also be provided along the valve members to ensure a fluid-tight seal in the closed positions of the valve members. Additionally, a valve internal space 35 is provided between the primary valve member 31 and the secondary valve member 32.

Figure 4:
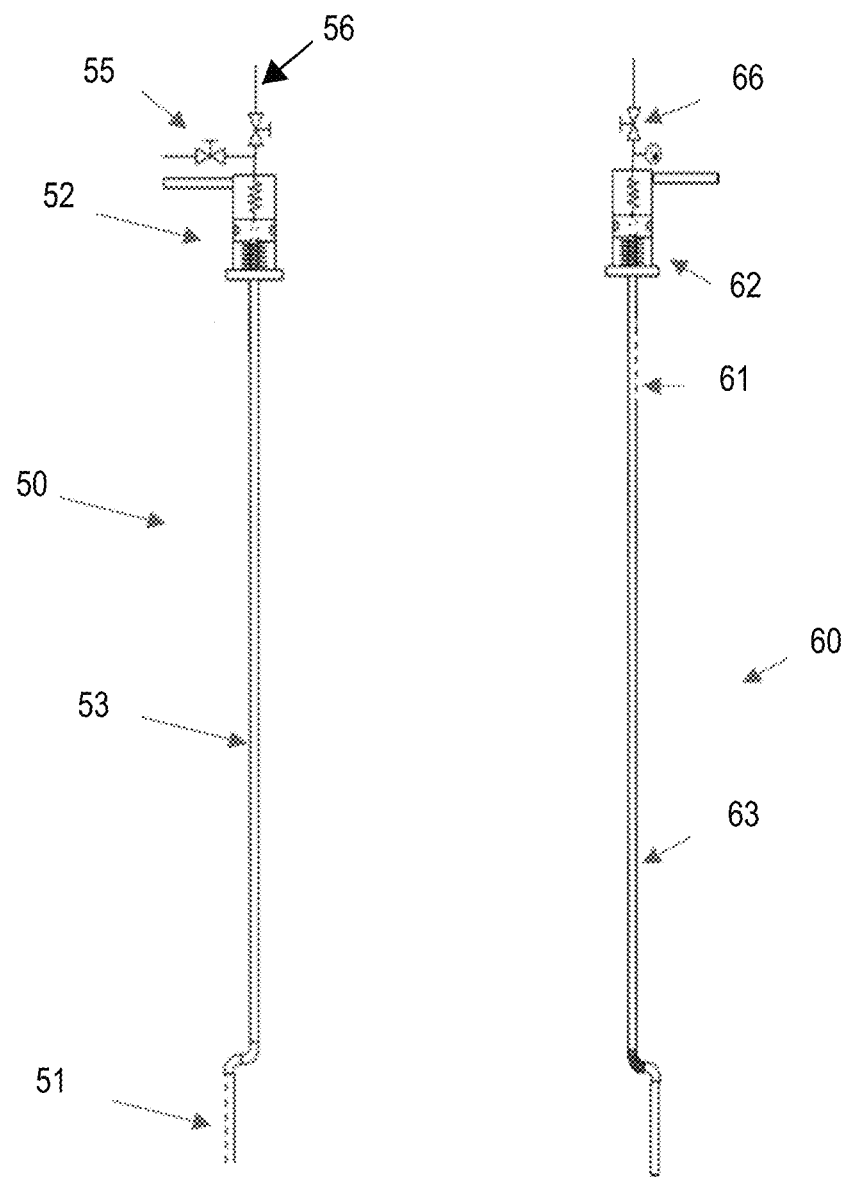
FIG. 4 is a schematic diagram of an actuator system according to some embodiments of the present disclosure.

FIG. 4 is a schematic diagram of the actuator system and actuators according to some embodiments of the present disclosure.

Referring to FIG. 4, the first actuator assembly 50 comprises a first pneumatic piston 52, a first actuator tube 53 which has a first opening 51 in the pump cold end space 16 at the bottom of the pump housing near the primary contact 36, where the first actuator tube 53 is in contact with the primary contact 36. The first pneumatic piston 52 is biased, e.g., via a spring, such that the first actuator tube 53 exerts no force on the primary contact 36 of the primary valve member 31 unless pneumatic pressure is provided in the first pneumatic piston 52. This design provides a fail-close arrangement for the primary valve member of the isolation mechanism 30.

The second actuator assembly 60 comprises a second pneumatic piston 62 similarly biased to provide a fail-close position, and a second actuator tube 63 which is in contact with the primary contact 36. The second actuator tube 63 has a second opening 61 near the pump-socket flange 22 in the warm end space 15. The first and second actuator tube 53, 63 openings through the respective pneumatic piston assemblies to allow gas or liquid to exit through appropriate isolation valves, such as isolation valves 55, 56, 66 for venting and/or purging, and/or to pressure indicators.

It is appreciated that the pneumatic pistons can also be electrically operated or manually operated valves to apply a biasing force to compress the spring in the respective pneumatic piston. One of the important features, however, is that the assembly should be biased in a fail-close position to ensure the safety of the isolation mechanism.

Figure 5:
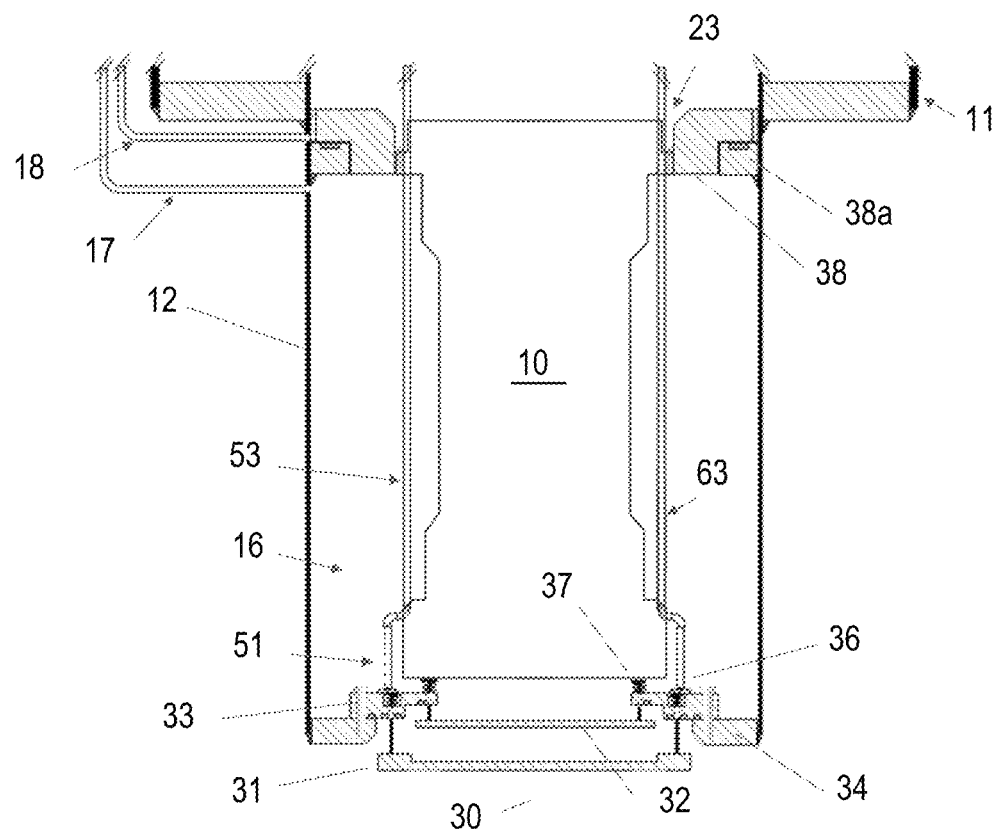
FIG. 5 is a schematic diagram illustrating the isolation mechanism in a fully open position during a normal operation mode according to some embodiments of the present disclosure.

FIG. 5 is a schematic diagram illustrating an operation of the isolation mechanism, where the primary valve member and the secondary valve member are in fully open positions during a normal operation mode according to some embodiments of the present disclosure.

As seen in FIG. 5, the extension flange 23 comprises a sealing ring 38 and a sealing ring retainer 38a to secure the pump extension flange 23 to the pump housing and to provide a seal to separate the liquid in the cold end space 16 from the gas space in the warm end space 15 (shown in FIG. 1). The sealing ring 38 is removable to provide clearance for removal of the isolation mechanism 30 once the mounting means 33 are removed and may be mounted either to the pump 10 or sealing ring retainer 38a. The sealing ring retainer 38a can be provided as a lip or protrusion that is welded, bolted, or otherwise fastened to the pump housing to provide a seat for the sealing ring 38. This is a critical arrangement to allow service for the isolation mechanism 30 through the pump housing without cutting open the storage vessel and to allow actuation of the actuator tubes 53, 63 and maintain separation between the cold end space 16 and the warm end space 15. Alternative means of allowing service access can be provided, for example, by combining the sealing ring 38 with the extension flange 23 into a single, albeit larger, member.

In one embodiment of the normal operation mode, e.g., a pumping mode, the primary valve member 31 of the isolation mechanism 30 is forced open by providing an actuating force, e.g., from the pistons, from the actuator tubes 53, 63 in contact with the primary contacts 36. The secondary valve member 32 of the isolation valve 30 is forced open by the weight of the pump 10 on the secondary contacts 37, which presses the secondary valve member 32 in the open position. This provides an open channel for the introduction of the fluid 40 from the storage vessel to the pump suction in the pump housing. However, it is also appreciated that the secondary valve member 32 can be forced open in various other ways, such as another set of actuator assemblies, solenoid assemblies, configuration of the primary valve member, etc.

Figure 6:
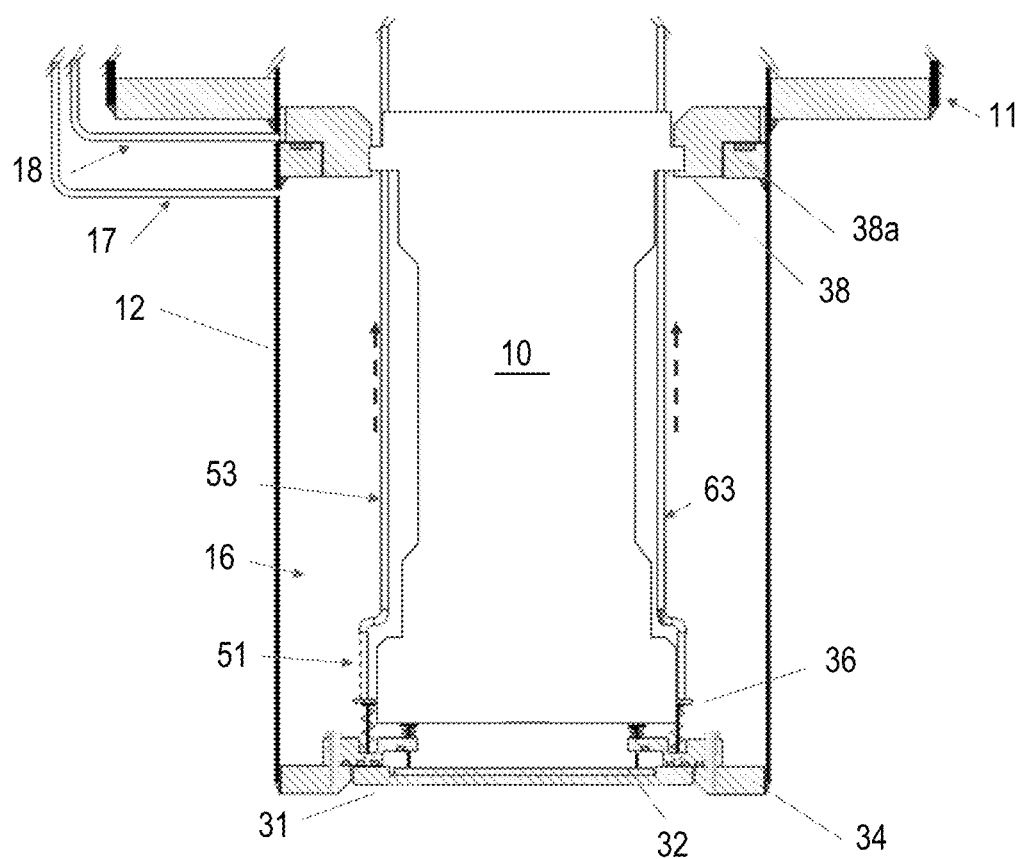
FIG. 6 is a schematic diagram illustrating a primary member of the isolation mechanism in a closed position for isolating the pump according to some embodiments of the present disclosure.

FIG. 6 is a schematic diagram illustrating a primary valve member of the isolation mechanism in the closed position, which can be in preparation for isolation of the submergible pump according to some embodiments of the present disclosure.

As shown in FIG. 6, when isolation of the submergible pump from the fluid and/or storage vessel is desired, the primary valve member 31 of the isolation mechanism 30 is closed by removing the force acting on the primary contacts 36. Accordingly, the actuator tubes 53, 63 move upward away from the primary contacts 36, e.g., due to the springs in the pneumatic pistons. This action is initiated by removing pneumatic pressure in the respective pneumatic pistons 52, 62. Since the pump housing is now closed from the storage vessel, any remaining liquid in the cold end space 16 can be pumped out, but no additional fluid can be introduced into the cold end at the pump suction.

Figure 7:
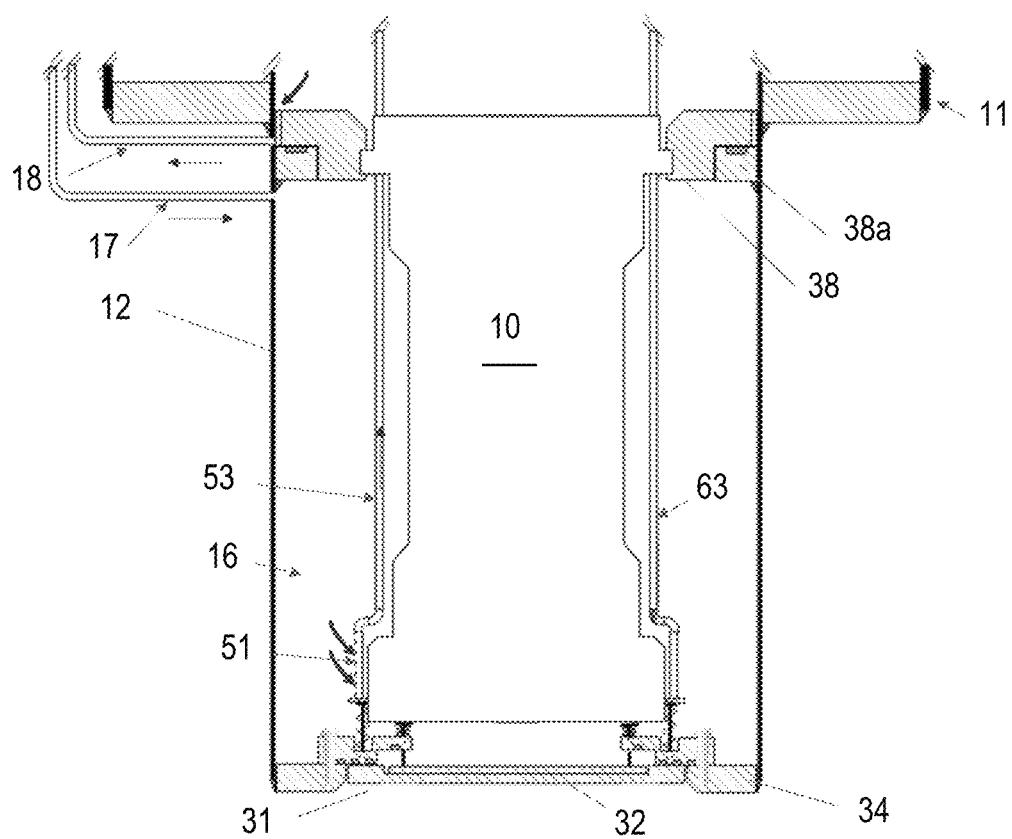
FIG. 7 is a schematic diagram of a depressurization process according to some embodiments of the present disclosure.

FIG. 7 is a schematic diagram of a depressurization process according to some embodiments of the present disclosure.

As seen in FIG. 7, after the remaining liquid in the cold end space 16 is substantially pumped out, the submergible pump is allowed to idle where any residual fluid is allowed to vaporize in a depressurization process. Valve 8 is closed at this time, so that the vapor from the warm end space 15 is able to move through the warm space vent line 18, through the cold space vent line 17 to the cold end space 16. This vapor, together with the vapor from any residual liquid in the cold end space 16, then passes through the opening(s) 51 on the actuator tube 53 and vents to a safe location or is recovered through vent valve 56. This depressurization process is allowed to continue until the residual liquid is substantially vaporized and the pressure is stable or equalized.

Figure 8A:
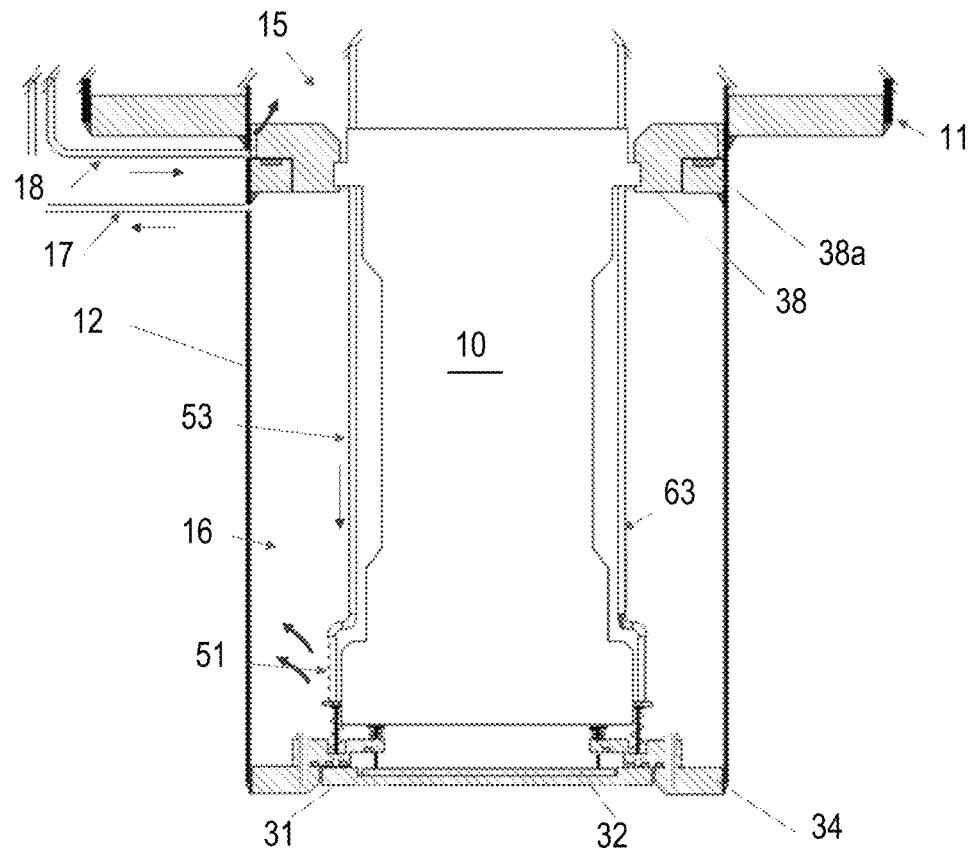
FIGS. 8a and 8b are schematic diagrams of a purging process according to some embodiments of the present disclosure.
Figure 8B:
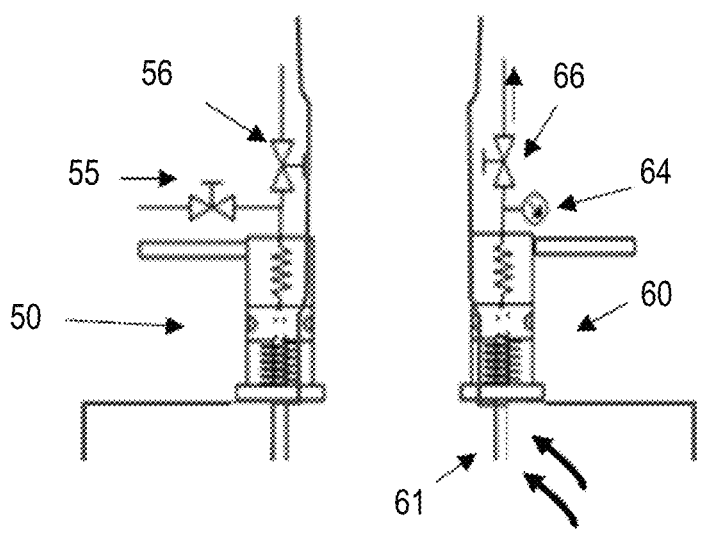

FIGS. 8a and 8b are schematic diagrams of a purging process according to some embodiments of the present disclosure. For systems storing flammable substances, a purging process can be used where a purge gas is introduced to displace the flammable substances in the pump housing before pump removal.

A purging process is illustrated in FIGS. 8a and 8b. As shown in FIG. 8b, a purge gas, e.g., nitrogen, helium, carbon dioxide, or air, is supplied to the actuator assembly 50 via valve 55. FIG. 8a shows that the purge gas flows through the actuator tube 53 and out through the opening 51 into the cold end space 16. The purge gas then goes through the cold space vent line 17, and through the warm space vent line 18 into the warm end space 15. From there, the purge gas flows through the opening 61 on the actuator tube 63 and out past the actuator assembly 60 via vent valve 66. The purging pressure is closely monitored through a pressure monitoring means 64, e.g., pressure gauge or sensor, to ensure no overpressure causes the primary valve member 31 to be forced open, e.g., where a purge gas pressure is greater than the spring force. The composition of the purge gas vent may also be monitored to ensure that the desired level is achieved before terminating the purging process.

Figure 9:
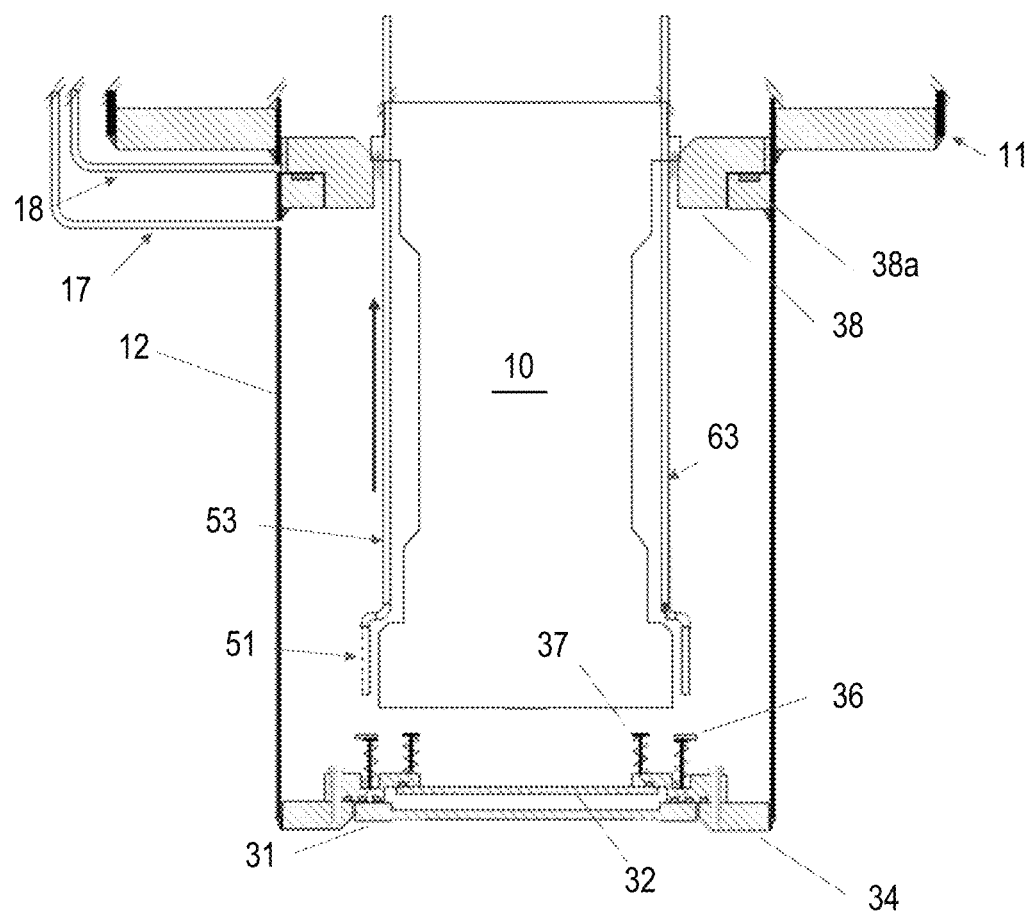
FIG. 9 is a schematic diagram illustrating that a secondary valve member of the isolation valve is closed so that a pump can be removed according to some embodiments of the present disclosure.

FIG. 9 is a schematic diagram illustrating a pump removal process according to some embodiments of the present disclosure.

Referring to FIG. 9, with the space in the pump housing sealed, purged, and depressurized, the submergible pump 10 can be removed for servicing or replacement. When the submergible pump 10 is raised, the force, e.g., weight, on the secondary contacts 37 is removed, causing the secondary valve member 32 to close. Closing the secondary valve member 32 provides a redundant sealing means to further isolate the pump housing from the fluid in the storage vessel.

Figure 10:
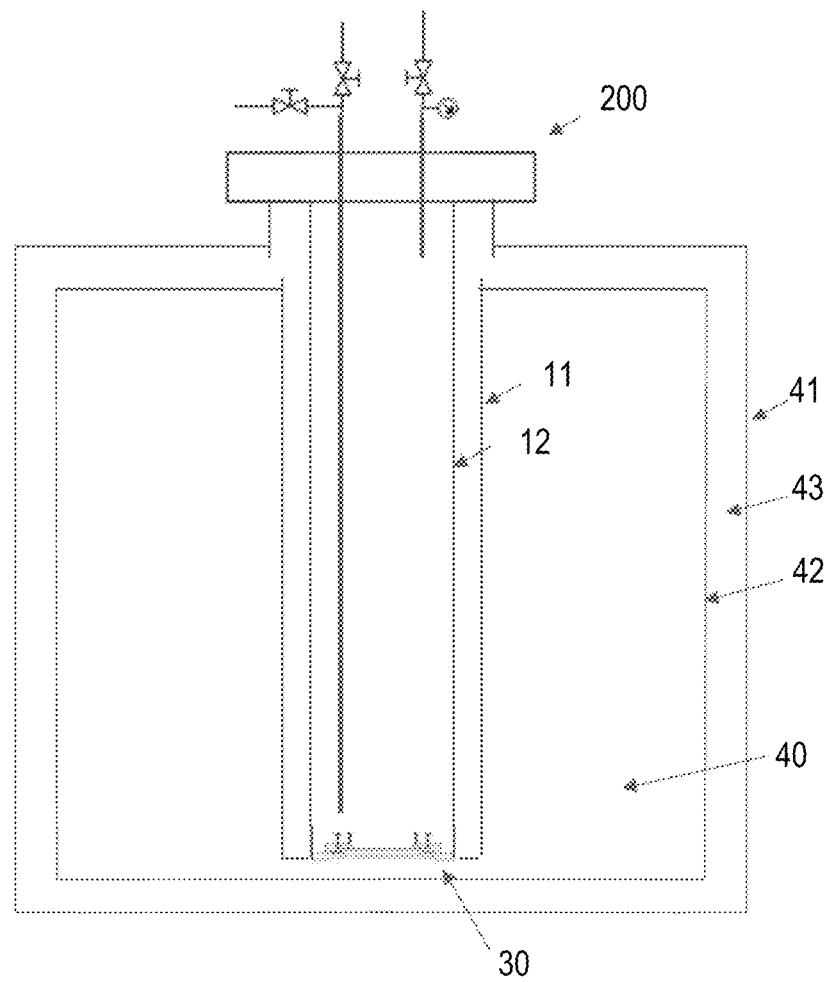
FIG. 10 is a schematic diagram illustrating that after a pump is removed, a sealing flange with purging and venting means is installed according to some embodiments of the present disclosure.

FIG. 10 is a schematic diagram illustrating that after the submergible pump is removed, a sealing flange with purging and venting means can be installed according to some embodiments of the present disclosure.

Referring to FIG. 10, the submergible pump 10 is completely removed from the pump housing, and both valve members 31, 32 of the isolation mechanism 30 are in the closed position. A replacement pump can be installed, or, as seen in FIG. 10, a sealing flange with a purging and venting means 200 can be placed to seal the pump housing space, as appropriate, which includes piping and valves to introduce the purge gas and venting via the venting means 200. When the sealing flange is used, continuous purging can be maintained to prevent any moisture or other impurities from entering the socket space by introducing a purge gas into the purge line and venting through the vent valve(s). If the continuous purging is provided, the purging pressure is closely monitored through a pressure gauge or sensor, to ensure no overpressure causes the primary valve member 31 or the secondary valve member 32 to be forced open, e.g., where a purge gas pressure is greater than the respective spring force.

Figure 11:
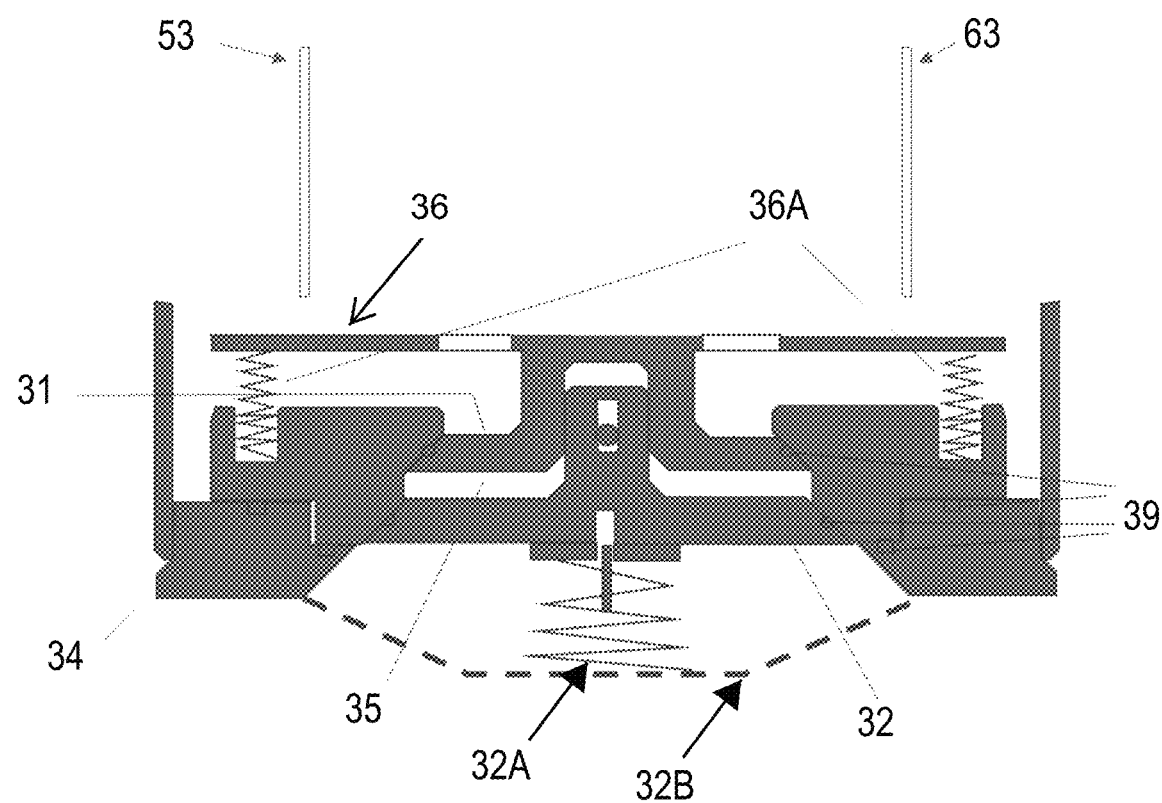
FIGS. 11-13 are schematic diagrams illustrating the operation of the isolation mechanism in another embodiment of the present disclosure.
Figure 12:
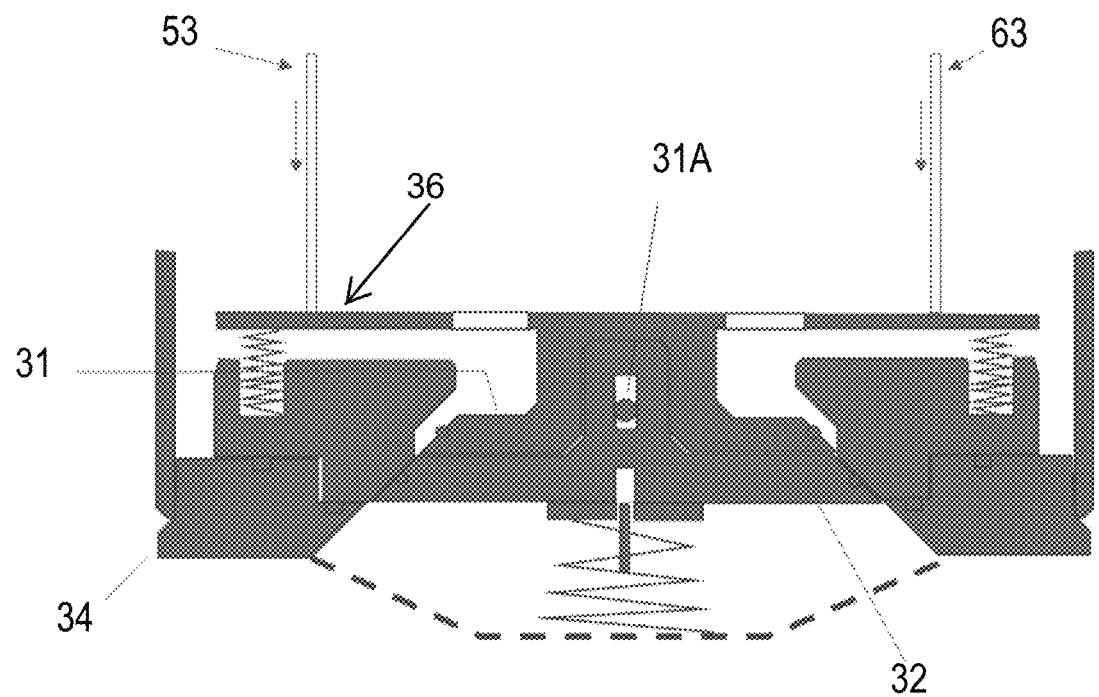
Figure 13:
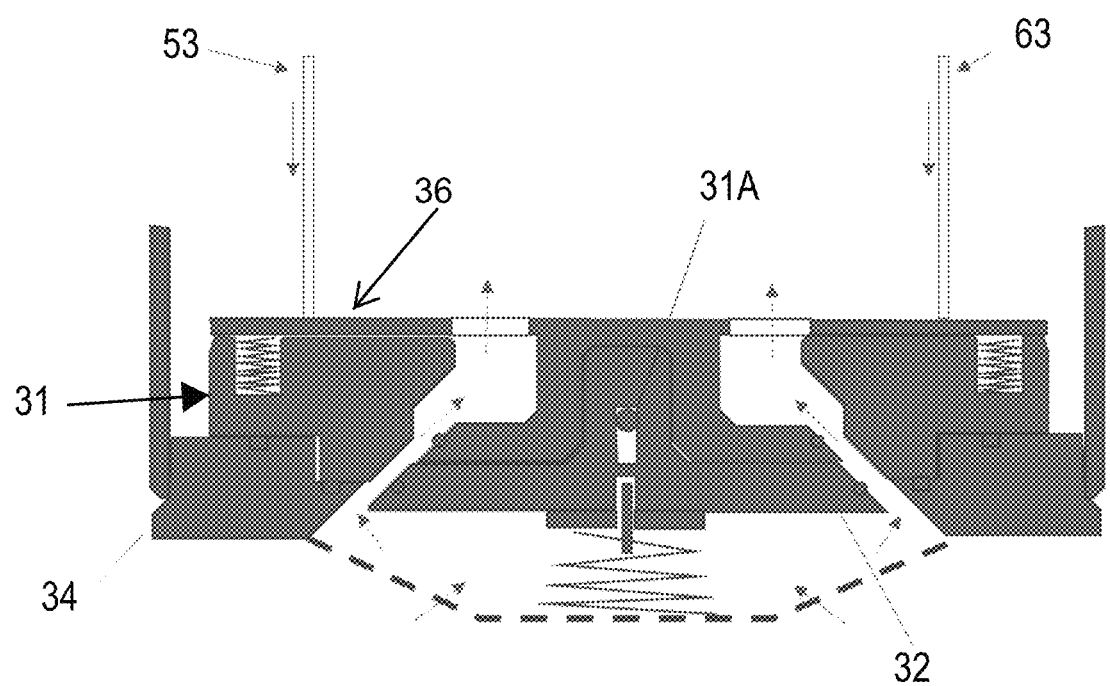

FIGS. 11-13 illustrate operation of another embodiment of the isolation mechanism of the present disclosure, where the primary valve member and the secondary valve member are operated in a different manner than the isolation valve illustrated in FIGS. 5-8b. Since the structure of this embodiment of the isolation valve is similar to the isolation valve illustrated in FIGS. 5-8b, similar features are not repeated, but only the differences in structure are detailed below.

FIG. 11 is a schematic diagram illustrating an operation of the isolation mechanism, where the primary valve member 31 and the secondary valve member 32 are in fully closed positions according to some embodiments of the present disclosure. Multiple small springs 36A push the primary valve member 31 closed, while a single large spring 32A at a bottom of the secondary valve member 32 holds the secondary valve member 32 in the closed position. A crossbar spring retainer 32B is used to hold the large spring 32A in place while being configured to allow the passage of fluid, when in normal operation. Multiple seals 39 ensure fluid-tight operation for isolation. In this closed position, the actuator tubes 53, 63 do not contact the primary contacts 36 of the primary valve member 31 and the pump is not in contact with any part of the isolation valve assembly, so that the springs 36A and 32A force close the primary valve member 31 and the secondary valve member 32.

FIG. 12 illustrates operation prior to the normal operation mode, e.g., a pumping mode, where the primary valve member 31 of the isolation mechanism 30 is forced open by providing an actuating force, e.g., from the pistons, from the actuator tubes 53, 63 which are in contact with the primary contacts 36. The contact from the actuator tubes 53, 63 overcome the springs 36A and push the primary valve member down and in the open position. A guide pin 31A is a component of the primary valve member 31 and is configured to slide along a slot in the secondary valve member 32.

As seen in FIG. 13, the secondary valve member 32 of the isolation valve 30 is forced open when the guide pin 31A reaches a top end of the slot of the secondary valve member 32, so that as the primary valve member 31 moves further downward, e.g., via further actuation of the actuator tubes 53, 63, the primary valve member 31 now pushes the secondary valve member 32 downward against the large spring 32A at the bottom of the secondary valve member 32. When the actuators 53, 63 are fully deployed, both the primary valve member 31 and the secondary valve member 32 are fully open.

Accordingly, it is understood that in this embodiment of the present disclosure, the isolation mechanism 30 is only actuated by the actuators 53, 63 by one action to apply force on the primary contacts 36. As the primary valve member 31 is opened, the secondary valve member 32 is automatically opened. Such an arrangement also provides a fail-safe design, because if pneumatic pressure is lost, e.g., for actuation of the actuators, the actuators will automatically retract and the springs will force close both the primary valve member and the secondary valve member, providing added safety through redundancy.

In some embodiments of the present disclosure, the fluid in the storage vessel is any flammable fuel.

In some other embodiments of the present disclosure, the fluid in the storage vessel is any liquefied gas.

In some other embodiments of the present disclosure, the fluid in the storage vessel is non-petroleum fuel.

In some other embodiments of the present disclosure, the fluid in the storage vessel is liquefied hydrogen. In some other embodiments of the present disclosure, the fluid in the storage vessel is liquefied natural gas.

In other embodiments of the disclosure, a method is provided for a pump removal procedure that includes a redundant isolation mechanism for the safe isolation of a pump housing from a storage vessel.

Figure 14:
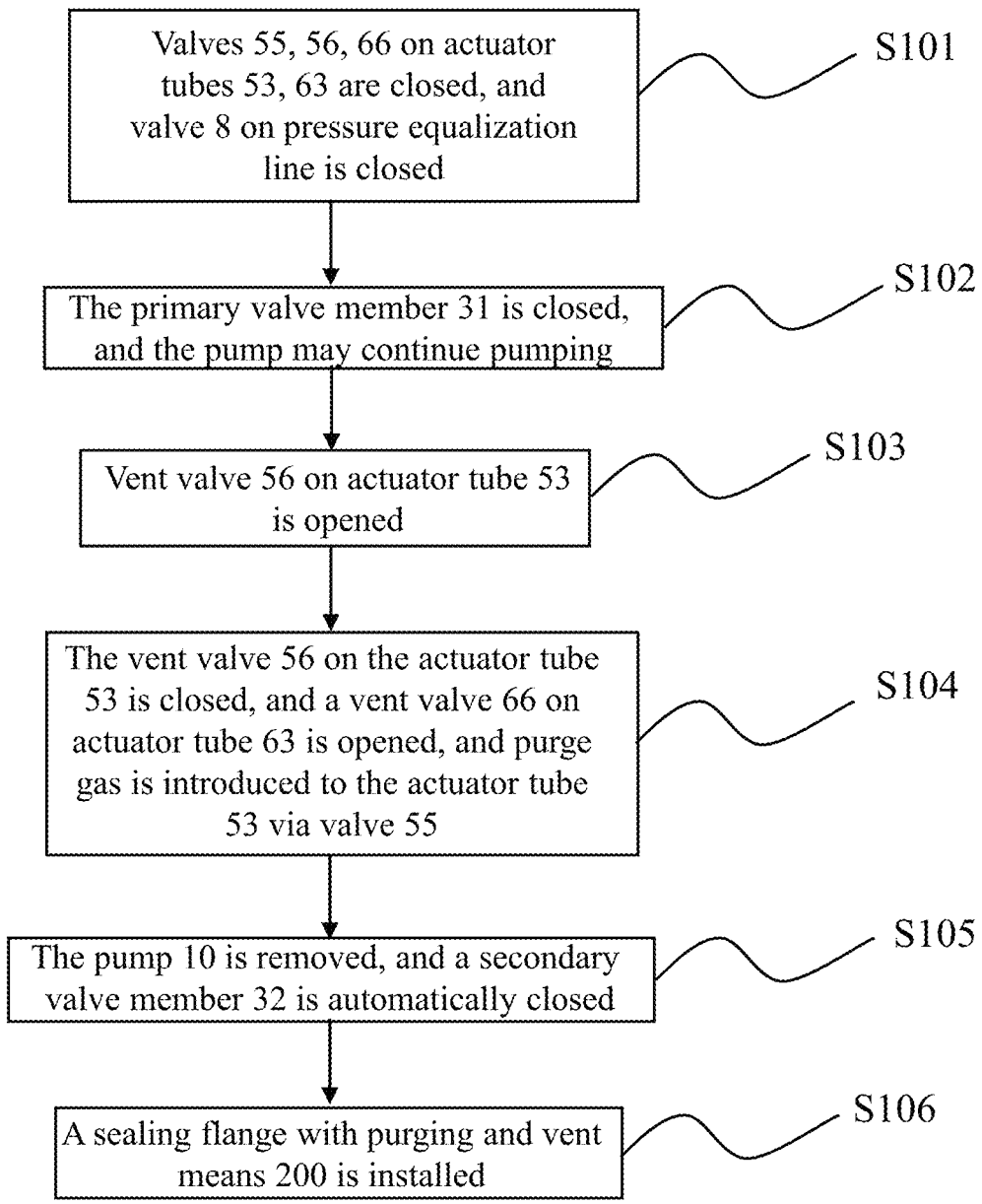
FIG. 14 is a flow chart of a pump removal procedure according to some embodiments of the present disclosure.

FIG. 14 is a flow chart of a pump removal method according to some embodiments of the present disclosure. In some embodiments of the present disclosure, when a pump 10 is to be removed from a pump housing, steps of the pump removal method are as follows:

Step 101 (S101): isolation valves 55, 56, 66 on actuator tubes 53, 63 are closed, and a valve 8 on a pressure equalization line 19 is closed.

Step 102 (S102): a primary valve member 31 is closed, and the pump may continue to operate by pumping.

The pneumatic pistons 52, 62 are biased, e.g., no air pressure or hydraulic pressure is provided, so that the springs bias the actuator tubes 53, 63 in a way so that no force is exerted on the primary contacts 36, therefore, the primary valve member 31 and/or the secondary valve member 32 of the isolation mechanism 30 are actuated in the fail-close position, e.g., by the springs, cutting off a supply of fluid from the storage vessel. The pump can continue pumping so that the fluid in the pump housing is pumped out.

Step 103 (S103): Vent valve 56 on actuator tube 53 is opened, gas from the warm space and vaporized liquid in the cold space are allowed to vent through valve 56 to safe location until any residual liquid in the cold space is substantially removed.

Step 104 (S104): The vent valve 56 on actuator tube 53 is closed, and a vent valve 66 on actuator tube 63 is opened. A valve 55 on the actuator tube 53 is opened, and purge gas is introduced into the actuator tube 53.

In some embodiments of the present disclosure, the purge gas flows through the actuator tube 53 and out through the opening 51 into the cold end space 16. The purge gas then goes through the cold space vent line 17, and goes through the warm space vent line 18 into the warm end space 15.

In some embodiments of the present disclosure, when the purge gas is introduced to the warm end space 15, the vent valve 56 on the actuator tube 53 is closed, and the vent valve 66 on an actuator tube 63 is opened. The purge gas flows through the opening 61 on the actuator tube 63 and out past the actuator assembly 60.

In some embodiments of the present disclosure, a pressure monitoring means 64, e.g., pressure sensor or gauge, on the actuator assembly 60 is installed to ensure no overpressure caused by the purge gas causes the primary valve member 31 to be forced open.

Step 105 (S105): the pump 10 is removed, and a secondary valve member 32 is automatically closed.

In some embodiments of the present disclosure, when the composition of the purged gas is achieved to the desired level, the pump 10 is removed, so that the force on the secondary contacts 37 is removed, causing the secondary valve member 32 to close.

Step 106 (S106): a sealing flange with purging and vent means 200 is installed to isolate the pump housing from the fluid in the storage vessel.

In other embodiments of the present disclosure, when the pump 10 is removed, a replacement pump is installed.

Figure 15:
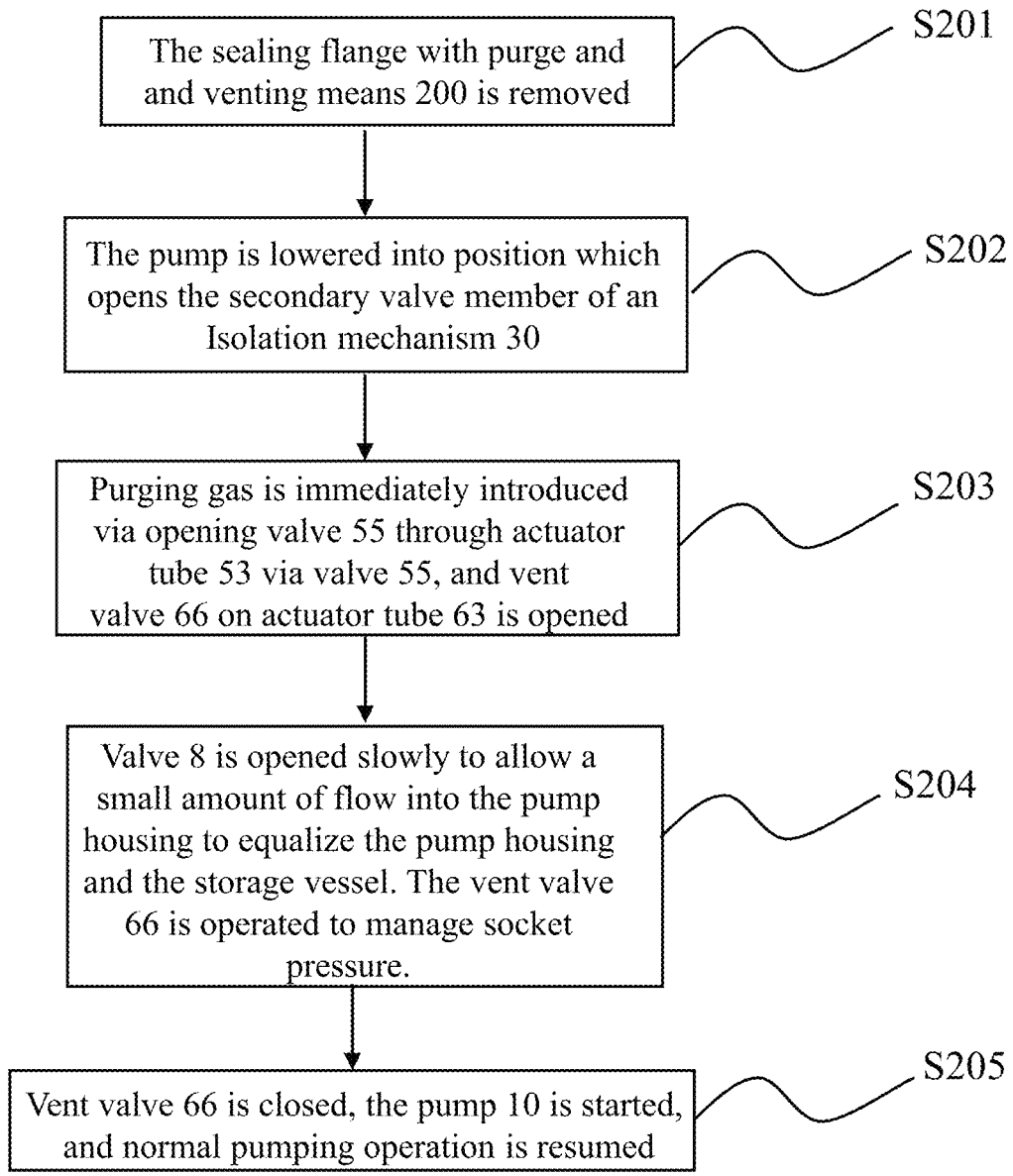
FIG. 15 is a flow chart of a pump installation procedure according to some embodiments of the present disclosure.

FIG. 15 is a flow chart of a pump installation procedure according to some embodiments of the present disclosure.

When a pump is to be installed, steps of the pump installation procedure are as follows:

Step 201 (S201): the sealing flange with purging and venting means 200 is removed.

Step 202 (S202): the pump is lowered into position which opens the secondary valve member 32 of the isolation mechanism 30.

Step 203 (S203): purging gas is immediately introduced via opening valve 55 through actuator tube 53, and vent valve 66 on actuator tube 63 is opened. When the pump is secured, purge valve 55, vent valves 56 and 66 are closed to stop purging and venting.

Step 204 (S204): valve 8 is opened slowly to allow a small amount of flow into the pump housing to equalize the pressure between the pump housing and the storage vessel and the vent valve 66 is operated to manage the socket pressure.

After a lower end of the pump has been allowed to cool down due to heat transfer with a socket inner wall 12, the primary valve member 31 of the isolation mechanism 30 is opened, and the fluid in the storage vessel is introduced into the pump cold end space 16.

Step 205 (S205): vent valve 66 is closed, the pump 10 is started, and normal pumping operation is resumed.

It should be noted that, although FIG. 3, 5-9 show the pump housing having a single wall in the cold end space 16, FIGS. 1, 2 and 10 show the double-wall vacuum structure extending to the isolation mechanism 30. These are alternative means of constructing the pump housing and the isolation mechanism. Further, the actuation means disclosed herein is pneumatic, but manual, electric or hydraulic actuators are also contemplated.

In the closed positions of the isolation mechanism 30, the valve internal space 35 may have residual fluid which may expand upon heating. In some embodiments of the present disclosure, a purging means is provided to relieve such pressure. In some other embodiments of the present disclosure, if the pressure builds up sufficiently, the pressure will force open the primary valve member 31 to release into the storage vessel. The secondary valve member 32, however, is provided to secure sealing of the pump housing for isolation from the storage vessel.

Some embodiments of the present disclosure provide a non-transitory computer readable storage medium that stores a computer program, wherein, the steps 101-106 are implemented when the computer program is performed by a computer.

Some embodiments of the present disclosure provide a computer program product which is stored in a non-transitory computer readable medium, wherein, the computer program product includes a computer program, where steps 101-106 are implemented when the computer program is performed by a computer.

Some embodiments of the present disclosure provide a computer readable storage medium that stores a computer program, wherein, the steps 201-205 are implemented when the computer program is performed by a computer.

It can be understood that the above embodiments are merely illustrative embodiments for the purpose of illustrating the principles of the disclosure, but the disclosure is not limited thereto. It will be apparent to those skilled in the art that various changes and modifications can be made therein without departing from the spirit and essence of the disclosure, which are also considered to be within the scope of the disclosure. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the presently described subject matter without departing from its scope. While the dimensions and types of materials described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Additional embodiments including any one of the embodiments described above may be provided by the disclosure, where one or more of its components, functionalities or structures are interchanged with, replaced by or augmented by one or more of the components, functionalities or structures of different embodiments described above.

The invention claimed is:

1. A fluid delivery system comprising:
a storage vessel for storing a fluid;
a pump housing provided in the storage vessel;
a pump insertable into the pump housing;
wherein the pump comprises an extension flange configured to divide an interior space of the pump housing into a cold end space and a warm end space; and
an isolation mechanism comprising:
a primary valve member provided at one end of the pump housing near a bottom of the storage vessel in the fluid, said primary valve member configured to be biased in a fail-closed position and configured to isolate the pump in the pump housing from the storage vessel,
a secondary valve member provided at the one end of the pump housing, said secondary valve member configured to be biased in a fail-closed position and configured to provide a second and redundant isolation of the pump in the pump housing from the storage vessel.

2. The fluid delivery system according to claim 1, wherein the primary valve member is configured to be actuatable externally of the storage vessel, and wherein the primary valve member comprises actuators that are hollow tubes configured to provide venting and purging for depressurization and clearing of any residual liquid or vapor in the pump housing.

3. The fluid delivery system according to claim 1, wherein the primary valve member comprises at least one first spring and at least one first contact, and wherein the secondary valve member comprises at least one second spring and at least one second contact, wherein said at least one first spring and at least one first contact and the at least one second spring and at least one second contact are configured to bias the respective primary valve member and secondary valve member in the fail-closed position.

4. The fluid delivery system according to claim 3, wherein the primary valve member of the isolation mechanism comprises at least one first pneumatic piston, wherein the actuators comprise at least one first actuator that is a hollow tube connected to the at least one first contact and includes an opening in the cold end space, wherein the at least one first pneumatic piston is configured to bias the at least one first actuator to contact the at least one first contact when pneumatic pressure is present.

5. The fluid delivery system according to claim 4, wherein the primary valve member further comprises at least one second pneumatic piston, wherein the actuators comprises at least one second actuator that is a hollow tube connected to a second contact of the at least one first contact and includes an opening in the warm end space, wherein the at least one second pneumatic piston is configured to bias the at least one second actuator to contact the second contact when pneumatic pressure is present.

6. The fluid delivery system according to claim 5, further comprising a warm space vent line connected to the warm end space and a cold space vent line connected to the cold end space joined together forming joined vent lines above a level of the fluid in the storage vessel, wherein the joined vent lines are connected to a pressure relief device and a pressure equalization line that is configured to flow into a vapor space of the storage vessel.

7. The fluid delivery system according to claim 1, wherein the isolation mechanism further comprises a retainer and mounting parts, said retainer configured to retain the isolation mechanism in the pump housing and said mounting parts configured to mount the isolation mechanism to the retainer.

8. The fluid delivery system according to claim 1, further comprising a sealing ring and a sealing ring retainer configured to secure the extension flange in the pump housing and to separate the fluid in the cold end space from the warm end space in the pump housing.

9. The isolation mechanism according to claim 1, wherein the liquid is at least one of flammable fuel, liquefied gas, a non-petroleum fuel, liquefied hydrogen, liquefied natural gas.

10. The isolation mechanism according to claim 1, wherein the secondary valve member is actuated automatically when the pump is positioned on the isolation mechanism.

11. The isolation mechanism according to claim 1, wherein the secondary valve member is actuated automatically to the fail-closed position when the primary valve member is biased in the fail-closed position.

12. An isolation mechanism for a pump in a fluid, comprising:
a primary valve member provided at one end of a pump housing, said primary valve member configured to be biased in a fail-closed position and configured to isolate the pump in the pump housing from a storage vessel;
a secondary valve member provided at the one end of the pump housing, said secondary valve member configured to be biased in a fail-closed position and configured to provide a second and redundant isolation of the pump in the pump housing from the storage vessel;
wherein the primary valve member is configured to be actuatable externally of the storage vessel,
wherein the secondary valve member is actuated automatically;
wherein the primary valve member comprises actuators that are hollow tubes configured to provide venting and purging for depressurization and clearing of any residual liquid or vapor in the pump housing,
wherein the pump comprises an extension flange configured to divide an interior space of the pump housing into a cold end space and a warm end space.

13. The isolation mechanism according to claim 12, wherein the primary valve member comprises at least one first spring and at least one first contact, and wherein the secondary valve member comprises at least one second spring and at least one second contact, wherein said at least one first spring and at least one first contact and the at least one second spring and at least one second contact are configured to bias the respective primary valve member and secondary valve member in the fail-closed position.

14. The isolation mechanism according to claim 13, wherein the primary valve member of the isolation mechanism comprises at least one first pneumatic piston, wherein the actuators comprise at least one first actuator that is a hollow tube connected to the at least one first contact and includes an opening, wherein the at least one first pneumatic piston is configured to bias the at least one first actuator to contact the at least one first contact when pneumatic pressure is present.

15. The isolation mechanism according to claim 14, wherein the primary valve member further comprises at least one second pneumatic piston, wherein the actuators comprises at least one second actuator that is a hollow tube connected to a second contact of the at least one first contact and includes an opening, wherein the at least one second pneumatic piston is configured to bias the at least one second actuator to contact the second contact when pneumatic pressure is present.

16. A method for removing and/or installing a pump from a storage vessel comprising the steps of:
closing a primary valve member provided at one end of a pump housing in the storage vessel by actuating an actuator, wherein the primary valve member is configured to be biased in a fail-closed position, wherein the closing of the primary valve member isolates the pump in the pump housing from the storage vessel;
removing the pump, wherein a secondary valve member provided at the one end of the pump housing is automatically closed, wherein said secondary valve member is configured to be biased in a fail-closed position and configured to provide a second and redundant isolation of the pump in the pump housing,
wherein the pump comprises an extension flange configured to divide an interior space of the pump housing into a cold end space and a warm end space.

17. The method according to claim 16, wherein the actuating of the actuator comprises removing pneumatic pressure from pneumatic pistons that provide a force on at least one actuator connected to the primary valve member.

18. The method according to claim 16, further comprising purging the pump housing by providing purging gas through the at least one actuator, wherein the at least one actuator is a hollow tube that comprises an opening and monitoring a pressure of the purging gas to ensure that no overpressurization exists that would cause the primary valve member to be forced in an open position.

19. The method according to claim 16, further comprising installing the pump and opening the primary valve member by actuating the actuator so that fluid in the storage vessel is introduced into the pump housing, wherein the secondary valve member is opened automatically.

* * * * *